United States Patent [19]
Walters et al.

[11] 3,785,734

[45] Jan. 15, 1974

[54] TEST METHOD FOR HYDRAULIC FLUIDS

[75] Inventors: William C. Walters, Delmont; Ronald A. Zabinski, Springdale, both of Pa.

[73] Assignee: Schroeder Brothers Corporation, McKees Rocks, Pa.

[22] Filed: Aug. 10, 1972

[21] Appl. No.: 279,444

[52] U.S. Cl. ..................... 356/36, 356/38, 356/201, 356/205
[51] Int. Cl. .......................................... G01n 21/22
[58] Field of Search ...................... 356/36, 38, 201, 356/204, 205, 207; 73/61

[56] References Cited
UNITED STATES PATENTS

| | | | |
|---|---|---|---|
| 3,352,197 | 11/1967 | Porges et al. | 356/36 |
| 3,654,801 | 4/1972 | Keefer et al. | 356/38 UX |
| 2,751,779 | 6/1956 | Hodson et al. | 356/207 X |

Primary Examiner—John K. Corbin
Assistant Examiner—F. L. Evans
Attorney—Webb, Burden, Robinson & Webb

[57] ABSTRACT

A method for testing for the contamination level of hydraulic fluids and the like, comprising passing a sample through two adjacent filter papers and comparing the light transmissivity thereof.

2 Claims, No Drawings

TEST METHOD FOR HYDRAULIC FLUIDS

Hydraulic systems comprise reservoirs, pumps and work elements such as hydraulic cylinders and motors. These systems, and especially servo hydraulic systems, must be maintained free of contaminants by filters to avoid damage to the hydraulic elements in the system. It is desirable to check the effectiveness of the filters from time to time to determine the contamination level (the source of contaminants includes, for example, solid particles of chemical breakdown of the fluid medium itself, contaminants created by the pump cylinder and valve port wear and erosion, contaminants present when the hydraulic system was first started up and those introduced by the installation of new or additional elements to the system or when adding fluid to the system).

Hence, the contaminants are microscopic. It is difficult to measure the presence in the fluid. Two methods are generally used to determine the degree of contamination or dirt level in hydraulic fluids. In one method, a measured volume of the sample is passed through a filter which is then examined under a microscope. The particles are visually sized and counted. This technique is slow and tedious and obviously cannot be used to make field checks for hydraulic fluid contamination. Another often used method is also inappropriate for field checks because of the delicacy and complexity of the equipment used. A measured volume of sample is passed in a small stream between a light and a photocell. When a particle passes the photocell, it is classified according to size and tallied according to classification.

The data obtained from these two laboratory methods will generally be set forth as a cumulative particle size distribution that plots as a straight line on log-log$^2$ coordinates. The slope of any distribution is generally about the same. However, dirty fluids will have a particle sized distribution wherein the plotted straight line is farther from the origin.

Dirt level classes have been established generally based on the log-log$^2$ plot of particle distribution, for example, the Society of Automotive Engineers (SAE) tentative contamination standards for hydraulic fluids has assigned class levels to the various degrees of contamination. Heretofore, there has been no quick field check for determining the class level of the contamination in a hydraulic fluid below the SAE class 6.

Briefly according to this invention, there is provided a method for determining the contamination level of fluids comprising a first step of drawing a measured volume of fluid to be tested. Thereafter, the fluid is passed through adjacent layers of filter paper. After flushing and drying, if necessary, the transmissivity to ordinary light of the two papers are compared. The ratio of the transmissivities has been found indicative of the contamination level of the fluid.

It is an advantage according to this invention that the test may be performed with rugged equipment suitable for use on the job and not necessarily in the laboratory environment. It is a further advantage of the test according to this invention that the results are reproducible and that the method can be used with fluids having a wide range of viscosities.

Further features and other objects and advantages of this invention will be described hereafter in the following detailed description.

The first step in testing a hydraulic fluid is to gather a representative sample. We have found that a sample of about 30 milliliters is suitable using the equipment and filter papers described hereafter. Using a 50 milliliter syringe with a filter disk attachment to hold filter papers wherein the attachment has a check valve allowing flushing and diluting fluid to be drawn into the syringe above the filter paper has been found particularly suitable. Without the filter disk attachment in place a sample of 30 milliliters may be drawn into the syringe. Thereafter, the syringe is placed in an inverted position to remove the air. At this time the filter disk assembly is attached to the syringe.

The filter disk assembly has placed therein two filter paper disks. We have found that Millipore RAWP 025 00, 1.2 micron white plain filter paper disks are particularly suitable.

If the fluid at this time cannot be easily forced through the filter disk assembly, it may be diluted by drawing a diluent through the check valve. For hydraulic fluids, triple filtered freon (1.2 micron millipore) has been found to work well. The freon is triple filtered so as not to add contamination to the sample. The diluent will reduce the sample viscosity enabling the sample to be forced through the filter disk assembly. After the sample has been forced through the filter disk assembly, the assembly is removed from the syringe and the syringe is flushed with freon until all traces of the sample fluid are removed. Thereafter, the syringe is filled with about 30 milliliters of freon which is used to flush the filter disks. Finally, air is pumped through the filter disk assembly with the empty syringe until all freon is evaporated.

The filter disk holder may then be disassembled and examined for residue of sample fluid. If any sample fluid is present, the flushing steps are repeated. The filter disks are then removed from the filter disk holder and carefully separated.

The downstream or second disk which is a reference sample is then placed in a disk holder which can be inserted between a light and a photocell. The output of the photocell is connected to a suitable meter. An ammeter has been found suitable. The light is connected through a rheostat to a suitable power source. The rheostat is adjusted until the light passing through the downstream filter disk causes the meter pointer to come to a substantially full scale position. (It should be noted that no range changes are necessary in the photocell-ammeter circuit.) It is convenient if the meter scale is calibrated in percent and the pointer brought to bear on the 100 percent position near full scale. Thereafter, the upstream filter disk upon which contaminants have been left is placed in the disk holder and the meter is read to determine a relative amount of light transmitted through the upstream filter disk. Where the meter is calibrated in percent, the reading will directly provide the percentage transmissivity of the upstream filter disk as compared to the reference disk. This reading will be indicative of the contamination level of the sample fluid. A percentage reading may be emperically calibrated to give information corresponding to the various contamination standards, for example, the tentative SAE standard. Sensitivity of the method may be varied by varying the quantity of the fluid in the sample.

Using the method described above, a number of samples were tested and the test results were compared to SAE class determinations made by laboratory methods such as the particle counting method described above. The results of these tests are set forth in the following table:

TABLE

| Sample | Test Number | Test Disk Reading (%) | SAE Class by Laboratory Methods |
|---|---|---|---|
| A | 1 | 92 | 2 |
|   | 2 | 87 |   |
| B | 1 | 87 | 1-2 |
|   | 2 | 89 |   |
| C | 1 | 79 |   |
|   | 2 | 72 | 3-4 |
| D | 1 | 64 | 5-6 |
|   | 2 | 66 |   |
| E | 1 | 70 | 6+ |

The above table establishes the reproducibility of the results according to this test method. It also establishes the correlation between the percentage reading or ratio of transmissivities and the SAE class designations. While applicants do not wish to be bound by any theory, it is believed that applicants' good results follow from the use of the two adjacent filter papers with one being used as a reference. This enables the coloring and opacifying effects of the various fluids on the filter papers to be accounted for. Since both filter papers receive substantially the same treatment except for the deposits of contamination, it is possible to alter the method by diluting and flushing as appears necessary during the testing of any particular sample where the properties of the sample so require without changing the results.

Having thus described our invention in detail and with the particularity required by the Patent Laws, what is desired to be protected by Letters Patent is set forth in the following claims.

We claim:

1. A method for determining the contamination level of hydraulic fluids comprising the steps for:

1. drawing a measured volume of sample fluid to be tested,
    2. diluting the sample fluid with a substantially contamination free fluid,
    3. passing the measured volume of fluid through first and second adjacent filter papers, said second paper being downstream from the first,
    4. washing the adjacent filter papers with a substantially contamination free fluid after the sample is passed therethrough,
    5. drying the adjacent filters by passing air therethrough, and
    6. comparing the light transmissivity of the first and second filter papers, the ratios thereof being indicative of the contamination level of the fluid.

2. A method according to claim 1 where in step (6) light is passed through the second paper and directed onto a photocell connected to a meter and the intensity of the light is adjusted to bring the meter reading to about the full scale value and thereafter light is passed through the first filter paper whereby the reading may be directly indicative of the dirt level of the fluid being tested.

* * * * *